(12) United States Patent
Fukuda et al.

(10) Patent No.: US 7,677,115 B2
(45) Date of Patent: Mar. 16, 2010

(54) MAGNETOSTRICTIVE TORQUE SENSOR AND ELECTRIC POWER STEERING APPARATUS

(75) Inventors: Yuichi Fukuda, Tochigi (JP); Nobuhiko Yoshimoto, Tochigi (JP); Hitoshi Karasawa, Toshigi (JP); Tomohiro Hoshi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 45 days.

(21) Appl. No.: 11/687,276

(22) Filed: Mar. 16, 2007

(65) Prior Publication Data
US 2007/0227269 A1   Oct. 4, 2007

(30) Foreign Application Priority Data
Mar. 20, 2006   (JP) ............................. 2006-077099

(51) Int. Cl.
*G01L 3/00* (2006.01)
(52) U.S. Cl. ................................................. 73/862.335
(58) Field of Classification Search ............ 73/862.331, 73/862.333, 862.335
See application file for complete search history.

(56) References Cited

U.S. PATENT DOCUMENTS

| | | | |
|---|---|---|---|
| 4,760,745 A * | 8/1988 | Garshelis | ................ 73/862.333 |
| 4,817,444 A | 4/1989 | Yagi et al. | |
| 5,142,919 A | 9/1992 | Satoh et al. | |
| 5,585,574 A * | 12/1996 | Sugihara et al. | ........ 73/862.334 |
| 6,098,468 A | 8/2000 | Mohri et al. | |
| 7,013,741 B2 * | 3/2006 | Nakamura et al. | ..... 73/862.333 |
| 7,263,904 B2 * | 9/2007 | Yoshida et al. | ......... 73/862.331 |
| 7,310,870 B2 * | 12/2007 | Shimizu et al. | ............... 29/594 |
| 7,386,930 B2 * | 6/2008 | Shimizu et al. | ............... 29/594 |
| 2004/0226384 A1 * | 11/2004 | Shimizu et al. | ............... 73/762 |
| 2007/0089287 A1 * | 4/2007 | Harata et al. | ............... 29/602.1 |
| 2007/0089538 A1 * | 4/2007 | Kashimura et al. | ..... 73/862.331 |
| 2007/0193372 A1 * | 8/2007 | Shimizu | ................ 73/862.333 |
| 2008/0053250 A1 * | 3/2008 | Yoneda et al. | ......... 73/862.333 |
| 2008/0066295 A1 * | 3/2008 | Shimizu et al. | ............... 29/609 |
| 2008/0257635 A1 * | 10/2008 | Shimizu et al. | ............. 180/446 |

FOREIGN PATENT DOCUMENTS

| | | |
|---|---|---|
| EP | 1 477 788 | 11/2004 |
| EP | 1 772 715 | 4/2007 |
| JP | 02-095228 | 4/1990 |
| JP | 2004-340744 | 12/2004 |
| JP | 2007-024641 | 2/2007 |

* cited by examiner

*Primary Examiner*—Lisa M Caputo
*Assistant Examiner*—Freddie Kirkland, III
(74) *Attorney, Agent, or Firm*—Rankin, Hill & Clark LLP

(57) ABSTRACT

A magnetostrictive torque sensor having a rotating shaft on which at least one magnetostrictive film is formed, and has such a structure that the rotating shaft has small diameter portions and large diameter portions positioned on both end sides of the small diameter portions, and a length in an axial direction of the small diameter portion is determined in relation to a coil width of an induction heating coil to be used at a high frequency heating step and one magnetostrictive film is formed in the small diameter portion.

3 Claims, 12 Drawing Sheets

DICTANCE FROM UPPER END OF MAGNETOSTRICTIVE FILM (mm)

HIGH FREQUENCY HEATING TEMPERATURE (°C)

MAGNETOSTRICTIVE TORQUE SENSOR AND ELECTRIC POWER STEERING APPARATUS

This application claims foreign priority from Japanese Patent Application No. 2006-077099, filed on Mar. 20, 2006, the entire contents of which are hereby incorporated by reference.

BACKGROUND OF THE INVENTION

1. Field of the Invention

The present invention relates to a magnetostrictive torque sensor and an electric power steering apparatus, and more particularly to a magnetostrictive torque sensor having a suitable structure for reducing a variation in a sensor sensitivity characteristic caused by heating a rotating shaft at a step of adding a magnetic anisotropy, and an electric power steering apparatus mounting the magnetostrictive torque sensor thereon.

2. Related Art

For example, in an electric power steering apparatus provided as a steering system of a vehicle, a steering torque added from a steering wheel to a steering shaft by a steering operation of a driver is generally detected by a steering torque detecting portion. The steering torque detecting portion is usually constituted by a torsion bar type torque sensor. Recently, a magnetostrictive torque sensor has also been proposed. The steering shaft functions as a rotating shaft to be rotated upon receipt of a rotating force by a steering operation and serves as a rotating shaft in the steering torque detecting portion. The electric power steering apparatus controls a driving operation of a steering force aiding motor in response to a torque signal detected through the steering torque detecting portion and relieves a steering force of a driver to give a comfortable steering feeling.

As described above, the magnetostrictive torque sensor has been known as a steering torque detecting portion to be used for the electric power steering apparatus. The magnetostrictive torque sensor is provided with a magnetostrictive film having magnetic anisotropies in reverse directions to each other in two predetermined places of a surface of the steering shaft. The magnetostrictive torque sensor has a structure of a sensor for detecting a change in a magnetostrictive characteristic of the magnetostrictive film corresponding to a twist generated on a steering shaft in non-contact when a torque acts on the steering shaft from a steering wheel.

In a process for manufacturing the magnetostrictive torque sensor as described above, it is necessary to provide a step of forming a magnetostrictive film on a predetermined surface of a part of the steering shaft, that is, a circumferential surface having a predetermined width in an axial direction in a rotating shaft and adding a magnetic anisotropy to the magnetostrictive film. Referring to a conventional method of adding the magnetic anisotropy to the magnetostrictive film in the manufacture of the magnetostrictive torque sensor, a twist torque is caused to act on the rotating shaft provided with a magnetostrictive material plated portion (magnetostrictive film) by an electrolytic plating treatment, for example, and a stress is applied to the circumferential surface of the rotating shaft to carry out a heat treatment over the rotating shaft by high frequency heating in a stress application state (for example, see JP-A-2004-340744).

When a steering shaft, that is, a rotating shaft provided with a magnetostrictive film constituting a magnetostrictive torque sensor is assembled into an electric power steering apparatus, the rotating shaft is assembled into a housing through a bearing. At that time, it is necessary to prevent the magnetostrictive film formed on the rotating shaft from being damaged in contact with the bearing. For this reason, it may be proposed that a diameter of a region having a predetermined width in an axial direction of the rotating shaft is set to be smaller than a diameter in the vicinity of both ends of the same region and two magnetostrictive films are formed in the region having the predetermined width in the same axial direction.

However, in the case in which the diameter in the region having the predetermined width in the axial direction of the rotating shaft is set to be smaller than the diameter in the vicinity of both ends in the same region and two magnetostrictive films are formed in the region having the predetermined width, the diameters of the rotating shaft in the vicinity of both ends of one of the magnetostrictive films are not equal to each other. For this reason, when high frequency heating is carried out by using an induction heating coil constituted by a one-winding coil portion to perform a heat treatment over one magnetostrictive film, a distance between an outer periphery of the rotating shaft in the vicinity of one of ends of the magnetostrictive film and the induction heating coil is different from a distance between the outer periphery of the rotating shaft in the vicinity of the other end of the magnetostrictive film and the induction heating coil. For this reason, a heating state of the rotating shaft in the vicinity of one of the ends of the magnetostrictive film is different from that of the rotating shaft in the vicinity of the other end. Consequently, there is a problem in that a temperature distribution in the magnetostrictive film is not uniform, it is hard to fabricate a magnetostrictive film having a homogeneous magnetic anisotropy and a detecting sensitivity has a variation.

The contents will be described with reference to FIGS. 12 to 14. FIG. 12 is a longitudinal sectional view showing a main part illustrating a relationship of a disposition in the case in which the magnetostrictive film deposited on the rotating shaft is heated by means of an induction heating coil formed by a one-winding coil portion. In a rotating shaft 100, a diameter $d_{100}$ of a region 101 having a predetermined width in an axial direction thereof is set to be smaller than a diameter $d_{101}$ of vicinal portions 102 and 103 on both ends of the region 101. In the rotating shaft 100, a step portion is formed together with the region 101 on both upper and lower ends thereof. Two magnetostrictive films 104 and 105 are formed on the region 101 having the predetermined width in the axial direction. The reference numeral 106 denotes an induction heating coil formed by a one-winding coil portion. As shown in FIG. 12, for example, the diameter $d_{101}$ of the rotating shaft in the vicinal portion 102 of an end 104A of the magnetostrictive film 104 is not equal to the diameter $d_{100}$ of the rotating shaft in a vicinal portion 101A for an end 104B. For this reason, a distance $D_{200}$ between the vicinal portion 102 and the induction heating coil 106 is different from a distance $D_{201}$ between the vicinal portion 101A and the induction heating coil. When the high frequency heating is carried out by using the induction heating coil 106 formed by the one-winding coil to carry out the heat treatment over the magnetostrictive film 104, therefore, a heating state of the rotating shaft in the vicinal portion 102 of the end 104A of the magnetostrictive film 104 is different from that of the rotating shaft in the vicinal portion 101A of the other end 104B. The foregoing is generated in the same manner when the other magnetostrictive film 105 is heated by the induction heating coil to add a magnetic anisotropy.

FIG. 13 is a graph showing a temperature distribution in the heating of the magnetostrictive film 104. In the graph of FIG. 13, an axis of abscissas indicates a distance (mm) from the end 104A on an upper side of the magnetostrictive film 104 in FIG. 12 and an axis of ordinates indicates a difference from a temperature in a temperature center portion 104C in a percentage (a difference: %) with respect to the temperature of the temperature center portion 104C for each position of the magnetostrictive film 104. A characteristic graph C100 indicates a characteristic of the temperature distribution. As is apparent from FIG. 13, the temperature distribution in the magnetostrictive film 104 is not uniform.

Moreover, FIG. 14 is a graph showing a sensitivity characteristic of a magnetostrictive torque sensor fabricated with the magnetostrictive films 104 and 105 with respect to a heating temperature for the same torque sensor. In the graph of FIG. 14, an axis of abscissas indicates a heating temperature and an axis of ordinates indicates a sensitivity characteristic. A characteristic graph C101 indicates a relationship between the heating temperature and the sensitivity characteristic. As is apparent from FIG. 14, the sensitivity characteristic is changed depending on the heating temperature. For this reason, it is apparent that the sensitivity has a variation when the heating temperature of the magnetostrictive film is not uniform as shown in FIG. 13.

SUMMARY OF THE INVENTION

One or more embodiments of the invention provide a magnetostrictive torque sensor which can cause a temperature distribution in a magnetostrictive film (a magnetostrictive material plated portion) to be substantially uniform when carrying out a heat treatment over the magnetostrictive film at a magnetic anisotropy adding step, can be provided with a magnetostrictive film having a uniform magnetic anisotropy and has a small variation in a detecting sensitivity, and an electric power steering apparatus mounting the magnetostrictive torque sensor thereon.

A first magnetostrictive torque sensor has a rotating shaft on which at least one magnetostrictive film is formed, the rotating shaft has a small diameter portion and a large diameter portion positioned on both end sides of the small diameter portion, a length in an axial direction of the small diameter portion is determined in relation to a coil width of an induction heating coil to be used at a high frequency heating step, and the magnetostrictive film is formed in the small diameter portion.

According to the first magnetostrictive torque sensor, when the high frequency heating is to be carried out by using the induction heating coil formed by a one-winding coil portion to perform a heat treatment over one magnetostrictive film, distances between the respective large diameter portions positioned on the both end sides of the magnetostrictive film and the induction heating coil are set to be equal to each other. Therefore, the heating states of the large diameter portions of the rotating shaft which are positioned in the vicinity of the both end sides of the magnetostrictive film are equal to each other. Consequently, a temperature distribution in the magnetostrictive film can become uniform so that a magnetostrictive film having a uniform magnetic anisotropy can be formed. Thus, it is possible to obtain a magnetostrictive torque sensor having a small variation in a detecting sensitivity.

According to a second magnetostrictive torque sensor, in the structure of the first magnetostrictive torque sensor, diameters of the two large diameter portions positioned on the both end sides of the small diameter portion may be equal to each other.

According to a third magnetostrictive torque sensor, in the structure of the first or second magnetostrictive torque sensor, distances between the two respective large diameter portions and corresponding portions of the induction heating coil may be equal to each other.

In addition, in accordance with one or more embodiments of the present invention, an electric power steering apparatus is provided with a motor for adding an auxiliary torque to a steering system, a steering torque sensor for detecting a steering torque of the steering system, and a controller for controlling a driving operation of the motor based on at least a steering torque signal sent from the steering torque sensor, and the steering torque sensor is set to be the first, second or third magnetostrictive torque sensor.

According to the magnetostrictive torque sensor in accordance with one or more embodiments of the invention, the rotating shaft has the small diameter portion and the large diameter portion positioned on the both end sides thereof, and furthermore, the small diameter portion has the predetermined length in the axial direction and one magnetostrictive film is provided in the small diameter portion. When the high frequency heating is carried out by using the induction heating coil formed by the one-winding coil portion to perform the heat treatment over the magnetostrictive film, therefore, the distances between the respective large diameter portions positioned on the both end sides of the magnetostrictive film and the induction heating coil are set to be equal to each other and the heating states of the large diameter portions of the rotating shaft positioned in the vicinity of the both end sides of the magnetostrictive film are equal to each other. Consequently, a temperature distribution in the magnetostrictive film can be uniform and a magnetostrictive film having a uniform magnetic anisotropy can be formed so that a magnetostrictive torque sensor having a small variation in a detecting sensitivity can be obtained.

According to the electric power steering apparatus in accordance with one or more embodiments of the invention, it is possible to carry out a stable operation by using the magnetostrictive torque sensor as a steering torque sensor.

Other aspects and advantages of the invention will be apparent from the following description and the appended claims.

Figure 1:
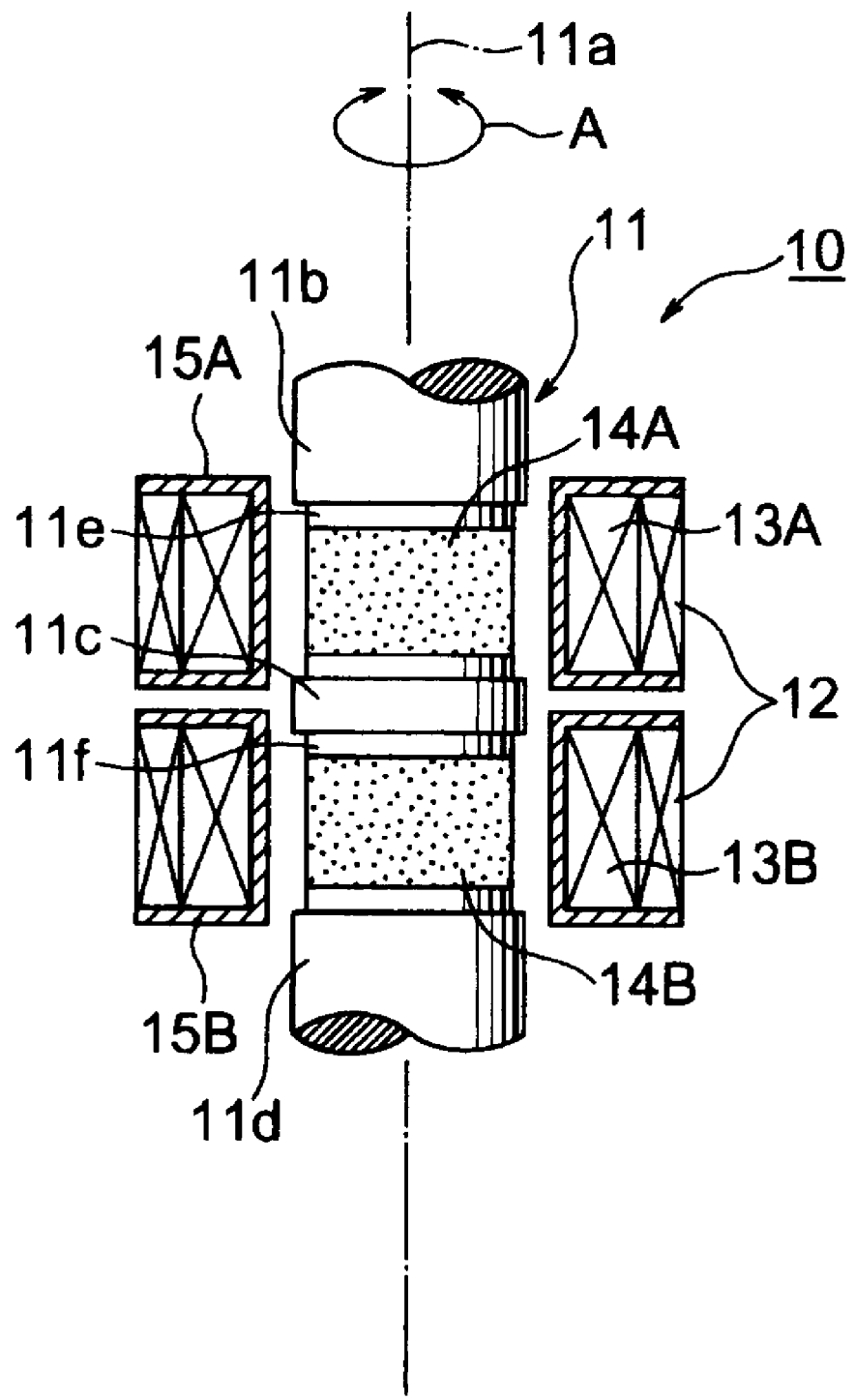
FIG. 1 is a partial sectional side view showing an exemplary embodiment of a magnetostrictive torque sensor according to the invention.

DESCRIPTION OF THE REFERENCE
NUMERALS AND SIGNS 10 magnetostrictive torque sensor
11 rotating shaft
11b, 11c, 11d large diameter portion
11e, 11f small diameter portion
12 exciting coil
13A, 13B detecting coil
14A, 14B magnetostrictive film
20 steering torque detecting portion
21 steering shaft
31 gear box
34 rack and pinion mechanism
35 power transmitting mechanism
42 motor
51A, 51B magnetostrictive characteristic curve (impedance characteristic curve)
P1 magnetostrictive film forming step
P2 magnetic anisotropy adding step
P3 characteristic stabilizing step

DETAILED DESCRIPTION OF THE
EXEMPLARY EMBODIMENTS

An exemplary embodiment of the invention will be described below with reference to the accompanying drawings.

Figure 2:
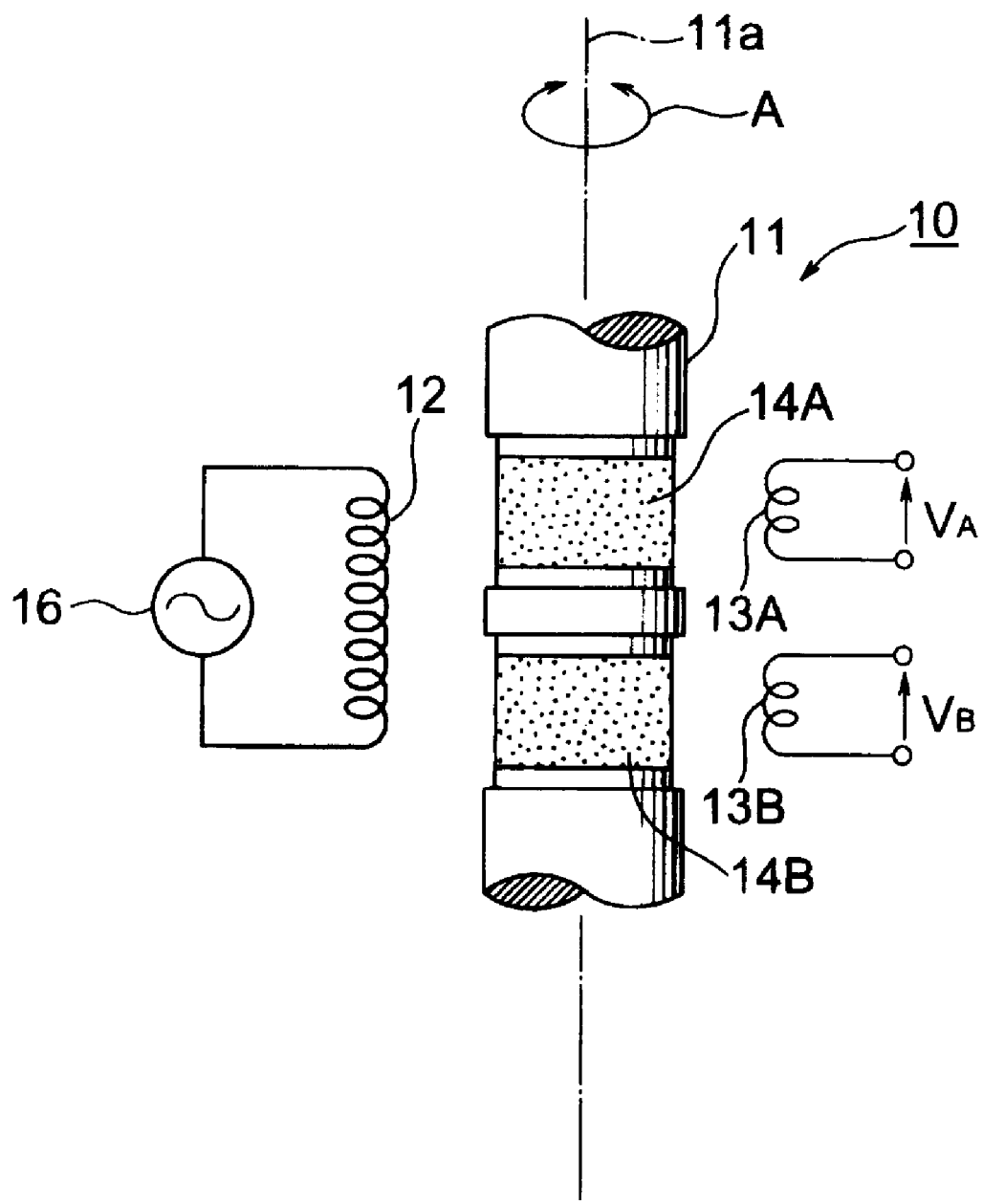
FIG. 2 is a side view conceptually showing a basic structure of the magnetostrictive torque sensor according to the exemplary embodiment.
Figure 3:
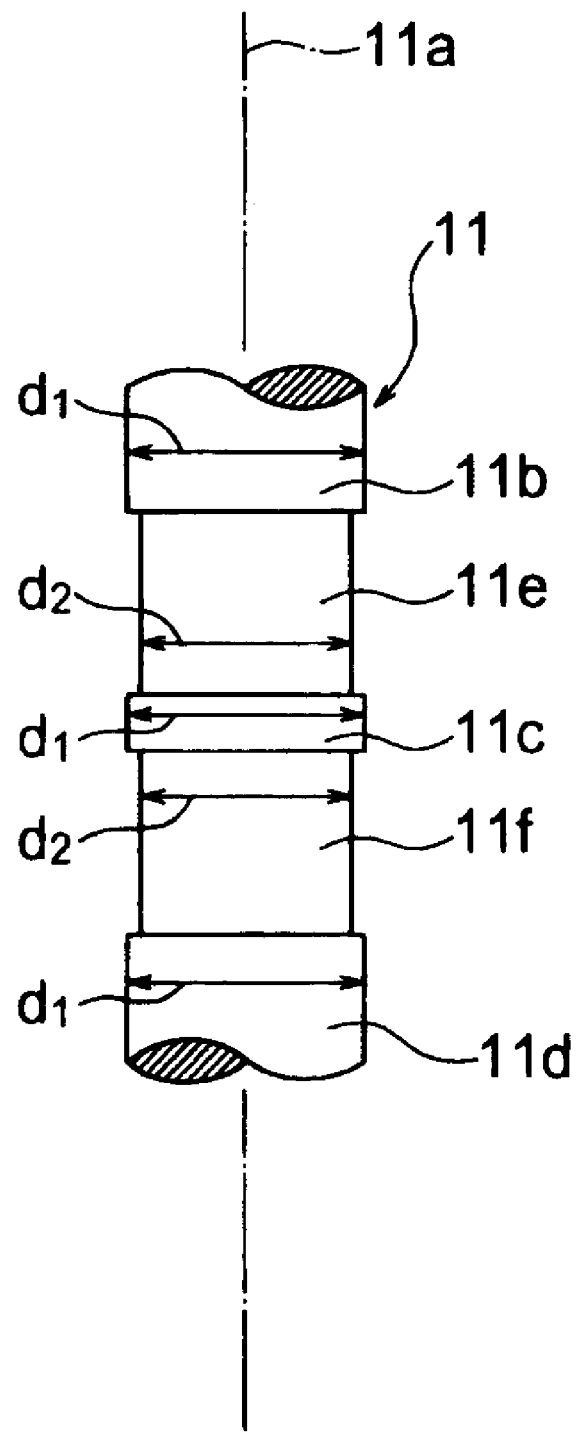
FIG. 3 is a partial side view showing a characteristic shape of a rotating shaft of the magnetostrictive torque sensor according to the exemplary embodiment.
Figure 4:
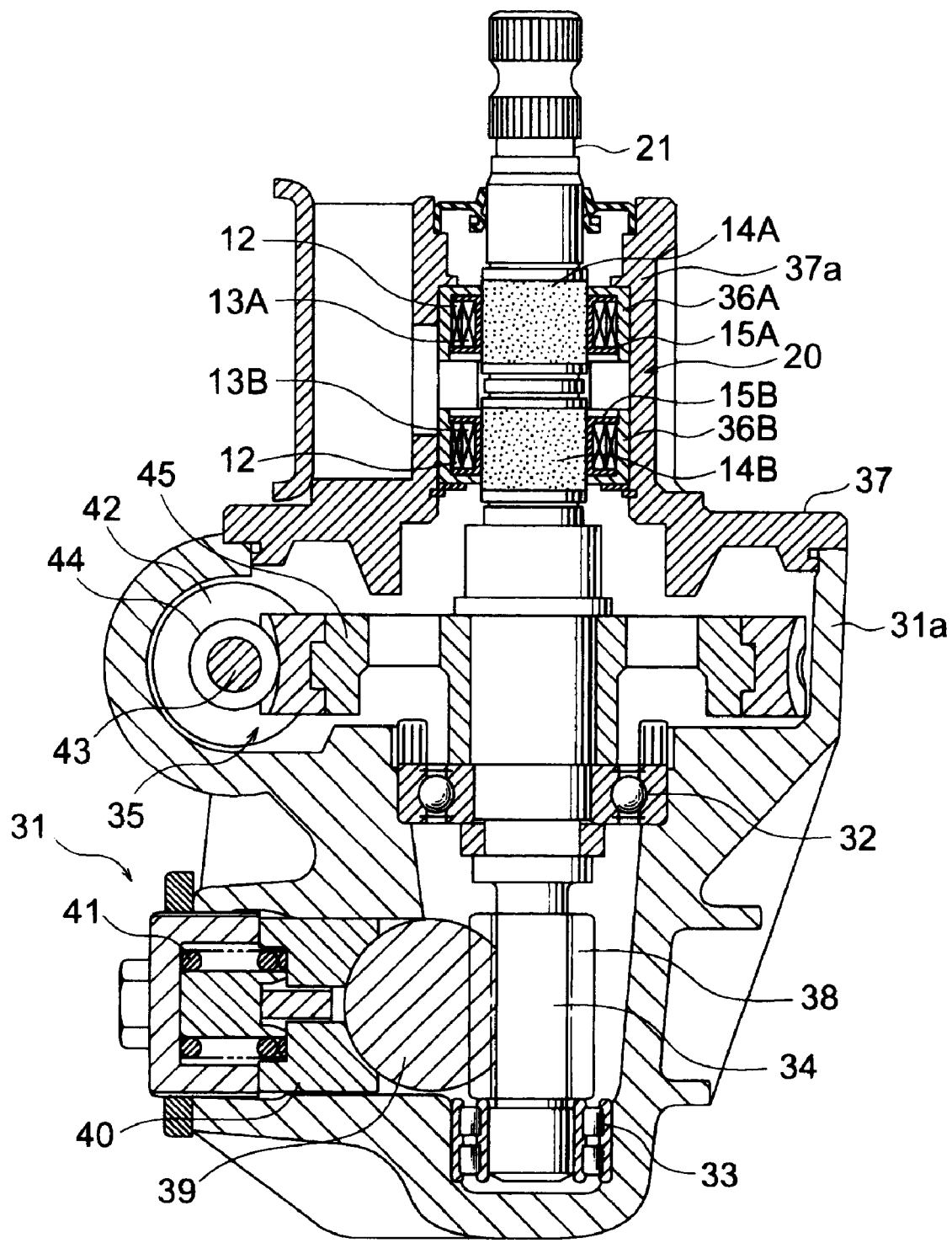
FIG. 4 is a longitudinal sectional view showing a main part of a specific structure in which the magnetostrictive torque sensor according to the exemplary embodiment is incorporated as a steering torque detecting portion in a steering shaft of an electric power steering apparatus.

A magnetostrictive torque sensor will be described with reference to FIGS. 1 to 4. FIGS. 1 to 4 show an example of a structure of the magnetostrictive torque sensor according to the exemplary embodiment. FIG. 1 is a partial sectional side view showing a basic structure of the magnetostrictive torque sensor, FIG. 2 is a side view conceptually showing the basic structure of the magnetostrictive torque sensor, FIG. 3 is a side view showing a part of only a rotating shaft constituting the magnetostrictive torque sensor, and FIG. 4 is a longitudinal sectional view showing a specific structure in which the magnetostrictive torque sensor is incorporated as a steering torque detecting portion into a steering shaft of an electric power steering apparatus.

As shown in FIGS. 1 and 2, a magnetostrictive torque sensor 10 is constituted by a rotating shaft 11, an exciting coil 12 disposed around the rotating shaft 11, and two detecting coils 13A and 13B. In FIGS. 1 to 3, the rotating shaft 11 is shown with upper and lower parts cut away and omitted for convenience of explanation.

With reference to an example of utilization shown in FIG. 4, the rotating shaft 11 is constituted as a part of a steering shaft 21, for instance.

In FIG. 1, the rotating shaft 11 receives a rotating force (torque) in a rightward (clockwise) or leftward (counterclockwise) direction as shown in an arrow A around an axial center 11a. The rotating shaft 11 is formed by a metal rod such as a chrome molybdenum steel product (an SCM material).

With reference to FIG. 3, description will be given to a shape of the rotating shaft 11 itself. The rotating shaft 11 is processed to include three large diameter portions 11b, 11c and 11d to be portions having large diameters and two small diameter portions 11e and 11f to be portions having small diameters. All of the diameters of the large diameter portions 11b, 11c and 11d are equal to each other and are indicated as $d_1$. The diameters of the small diameter portions lie and 11f are also equal to each other and are indicated as $d_2$. The small diameter portion 11e is formed between the large diameter portion 11b and the large diameter portion 11c, and the small diameter portion 11f is formed between the large diameter portion 11b and the large diameter portion 11d. Accordingly, the large diameter portions 11b and 11c are formed on both end sides of the small diameter portion 11e respectively, and the large diameter portions 11b and 11d are formed on both end sides of the small diameter portion 11f respectively. A step portion is formed between each of the three large diameter portions 11b, 11c and 11d and each of the two small diameter portions 11e and 11f. A difference between the diameters $d_1$ and $d_2$ is approximately 0.3 mm, for example. Accordingly, a step between the large diameter portions 11b, 11c and 11d and the small diameter portions 11e and 11f is approximately 0.15 mm, for example. A magnetostrictive film is formed on each of peripheral surfaces of the small diameter portions 11e and 11f in the two places by a film forming technique.

Lengths (widths) in an axial direction of the small diameter portions 11e and 11f forming the magnetostrictive film are determined to be substantially equal to each other in relation to a length (width) in the axial direction of a one-winding coil portion which will be described below in an induction heating coil (RC) having the one-winding coil portion.

Returning to FIG. 1, description will be given. In the rotating shaft 11, magnetostrictive films 14A and 14B are provided on the small diameter portions 11e and 11f in the two upper and lower portions in the axial direction, respectively. The magnetostrictive films 14A and 14B have certain widths in the axial direction of the rotating shaft 11 and are formed over a whole periphery in a circumferential direction of the rotating shaft 11 in the small diameter portions 11e and 11f of the rotating shaft 11, respectively. A width in the axial direction of each of the magnetostrictive films 14A and 14B is optionally set depending on conditions. The magnetostrictive films 14A and 14B are formed as magnetostrictive material plated portions on a surface of the rotating shaft 11 by an electrolytic plating treatment. A magnetic anisotropy processing is carried out over the magnetostrictive material plated portion so that the magnetostrictive films 14A and 14B having a magnetic anisotropy are formed.

In the following description, for convenience of explanation, the "magnetostrictive films 14A and 14B" and the "magnetostrictive material plated portions (14A, 14B)" are identical to each other and are used properly depending on the stage and situation of a manufacture. In principle, the "magnetostrictive films 14A and 14B" are used in a stage in which the magnetic anisotropy is added to achieve a completion, and the "magnetostrictive material plated portions (14A, 14B)" are used in a previous stage thereto.

As shown in FIG. 1, the exciting coil 12 and the detecting coils 13A and 13B are provided corresponding to the two magnetostrictive films 14A and 14B formed on the surface of the rotating shaft 11, respectively. More specifically, as shown in FIG. 1, the detecting coil 13A is disposed around the magnetostrictive film 14A with a clearance provided therebetween. The ring-shaped detecting coil 13A surrounds a whole periphery of the magnetostrictive film 14A and a width in the axial direction of the detecting coil 13A is substantially equal to that in the axial direction of the magnetostrictive film 14A. Moreover, the detecting coil 13B is disposed around the magnetostrictive film 14B with a clearance provided therebetween. Similarly, the ring-shaped detecting coil 13B surrounds a whole periphery of the magnetostrictive film 14B and a width in the axial direction of the detecting coil 13B is substantially equal to that in the axial direction of the magnetostrictive film 14B. Furthermore, the ring-shaped exciting coil 12 is disposed around the two detecting coils 13A and 13B respectively. As shown in FIG. 1, the exciting coil 12 is individually provided corresponding to the magnetostrictive films 14A and 14B respectively. Actually, two portions of one exciting coil 12 are shown separately. The detecting coils 13A and 13B and the exciting coil 12 are wound upon peripheral spaces of the magnetostrictive films 14A and 14B by utilizing ring-shaped support frame member portions 15A and 15B provided on the periphery of the rotating shaft 11 to surround the rotating shaft 11.

FIG. 2 conceptually shows an electrical relationship between the exciting coil 12 and the detecting coils 13A and 13B which are disposed for the magnetostrictive films 14A and 14B of the rotating shaft 11. An AC power supply 16 for always supplying an alternating current for excitation is connected to the exciting coil 12 disposed in common to the magnetostrictive films 14A and 14B. Moreover, induced voltages $V_A$ and $V_B$ corresponding to a torque to be a detecting object are output from output terminals of the detecting coils 13A and 13B disposed corresponding to the magnetostrictive films 14A and 14B, respectively.

The magnetostrictive films 14A and 14B formed on the surfaces of the small diameter portions 11e and 11f in two places of the rotating shaft 11 are fabricated by an electrolytic plating treatment through Ni—Fe plating, for example, and have the magnetic anisotropy. The two magnetostrictive films 14A and 14B are fabricated to have magnetic anisotropies in reverse directions to each other, respectively. When a torque generated by a rotating force acts on the rotating shaft 11, reverse magnetostrictive characteristics generated on the magnetostrictive films 14A and 14B are detected by utilizing the detecting coils 13A and 13B provided around the magnetostrictive films 14A and 14B.

The magnetostrictive torque sensor 10 is incorporated as a steering torque detecting portion into a steering shaft of an electric power steering apparatus as shown in FIG. 4, for example. When the steering shaft (rotating shaft) provided with a magnetostrictive film constituting a magnetostrictive torque sensor is to be assembled into the electric power steering apparatus, moreover, it is assembled into a housing through a bearing.

As described above, the diameter $d_2$ of the small diameter portions 11e and 11f in the two places of the rotating shaft 11 is set to be smaller than the diameter $d_1$ of the large diameter portions 11b, 11c and 11d in three places thereof, and the magnetostrictive films 14A and 14B are formed on the peripheral surfaces of the small diameter portions 11e and 11f in the two places, respectively. Therefore, it is possible to prevent the magnetostrictive films 14A and 14B formed on the rotating shaft 11 from being damaged in contact with the bearing. In FIG. 4, substantially identical elements as those described with reference to FIGS. 1 to 3 have the same reference numerals. FIG. 4 shows constructions of a steering torque detecting portion 20, a support structure of the steering shaft 21 (corresponding to the rotating shaft 11), a rack and pinion mechanism 34, a power transmitting mechanism 35, and a steering force aiding motor 42.

In FIG. 4, an upper part of the steering shaft 21 is coupled to a steering wheel (not shown) of a vehicle. A lower part of the steering shaft 21 is constituted to transmit a steering force to an axle provided with a rack shaft through the rack and pinion mechanism 34. The steering torque detecting portion 20 provided additionally on the upper part of the steering shaft 21 is constituted by utilizing the magnetostrictive torque sensor 10. The steering torque detecting portion 20 corresponds to the magnetostrictive torque sensor 10, and furthermore, a portion of the steering shaft 21 on which the magnetostrictive films 14A and 14B are formed corresponds to the rotating shaft 11.

In a housing 31a forming a gear box 31, the steering shaft 21 is supported rotatably by two bearing portions 32 and 33. The rack and pinion mechanism 34 and the power transmitting mechanism 35 are accommodated in the housing 31a.

The steering torque detecting portion 20 (the magnetostrictive torque sensor 10) is provided additionally to the steering shaft 21. The magnetostrictive films 14A and 14B are formed on the steering shaft 21, and the exciting coil 12 and the detecting coils 13A and 13B are supported and provided on the support frame member portions 15A and 15B and yoke portions 36A and 36B corresponding to the magnetostrictive films 14A and 14B.

An upper opening of the housing 31a is blocked with a lid 37. A pinion 38 provided on a lower end of the steering shaft 21 is positioned between the bearing portions 32 and 33. A rack shaft 39 is guided by a rack guide 40 and is energized by a compressed spring 41, and is thus pushed toward the pinion 38 side. The power transmitting mechanism 35 is formed by a worm gear 44 fixed to a transmitting shaft 43 coupled to an output shaft of the steering force aiding motor 42, and a worm wheel 45 fixed to the steering shaft 21. The steering torque detecting portion 20 is attached to an inner part of a cylindrical portion 37a of the lid 37.

The steering torque detecting portion 20 detects a steering torque acting on the steering shaft 21. A detection value is input to a control device (not shown) and is used as a reference signal for generating a proper auxiliary steering torque for the motor 42. When the steering torque generated from the steering wheel acts on the steering shaft 21, the steering torque detecting portion 20 electrically detects a change in magnetic characteristics of the magnetostrictive films 14A and 14B corresponding to a twist generated on the steering shaft 21 as a change in the induced voltages $V_A$ and $V_B$ from respective output terminals of the detecting coils 13A and 13B.

When the steering torque acts on the steering shaft 21, the twist is generated on the steering shaft 21. As a result, a magnetostrictive effect is generated on the magnetostrictive films 14A and 14B. In the steering torque detecting portion 20, a current for excitation is always supplied from the AC power supply 16 to the exciting coil 12. Therefore, a change in a magnetic field caused by the magnetostrictive effects in the magnetostrictive films 14A and 14B is detected as a change in the induced voltages $V_A$ and $V_B$ by the detecting coils 13A and 13B. According to the steering torque detecting portion 20, a difference between the two induced voltages $V_A$ and $V_B$ is output as a detected voltage value based on the change in the induced voltages $V_A$ and $V_B$. Accordingly, it is possible to detect a direction and magnitude of the steering torque applied to the steering shaft 21 based on an output voltage value ($V_A - V_B$) of the steering torque detecting portion 20.

Figure 5:
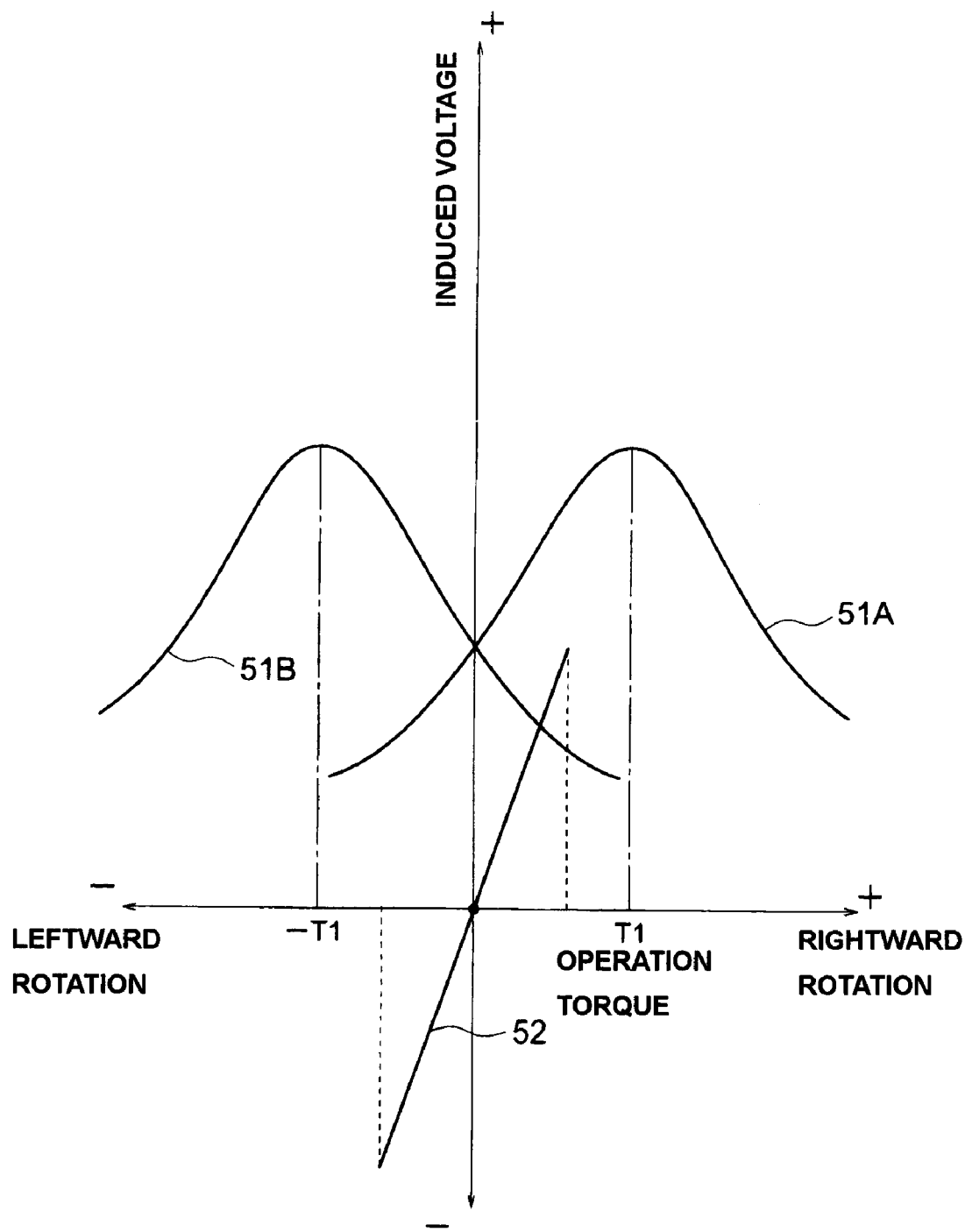
FIG. 5 is a graph showing a magnetostrictive characteristic curve related to each detecting coil in the magnetostrictive torque sensor according to the exemplary embodiment and a sensor detecting characteristic.

Referring to FIG. 4, description will be given in more detail. FIG. 5 is a chart showing respective magnetostrictive characteristic curves 51A and 51B of the two magnetostrictive films 14A and 14B as described above. In FIG. 5, an axis of abscissas indicates the steering torque applied to the steering shaft 21 in which a positive side (+) corresponds to a rightward rotation and a negative side (−) corresponds to a leftward rotation. Moreover, an axis of ordinates in FIG. 5 indicates an axis of a voltage.

The magnetostrictive characteristic curves 51A and 51B for the magnetostrictive films 14A and 14B represent detecting output characteristics of the detecting coils 13A and 13B at the same time. More specifically, an alternating current for excitation is supplied through the common exciting coil 12 to the magnetostrictive films 14A and 14B having the magnetostrictive characteristic curves 51A and 51B, and the detecting coils 13A and 13B output the induced voltages in response to the AC current for excitation. Consequently, the change characteristics of the induced voltages of the detecting coils 13A and 13B correspond to the magnetostrictive characteristic curves 51A and 51B of the magnetostrictive films 14A and 14B. In other words, the magnetostrictive characteristic curve 51A indicates the change characteristic of the induced voltage $V_A$ output from the detecting coil 13A. On the other hand, the magnetostrictive characteristic curve 51B indicates the change characteristic of the induced voltage $V_B$ output from the detecting coil 13B.

According to the magnetostrictive characteristic curve 51A, a value of the induced voltage $V_A$ output from the detecting coil 13A has such a characteristic that a value of the steering torque is changed from a negative region to a positive region, and furthermore, is increased in an substantially linear characteristic when a positive value T1 of the steering torque is gradually reached, takes a peak value when the steering torque has the positive value T1, and is gradually decreased when the steering torque is further increased from T1. On the other hand, the magnetostrictive characteristic curve 51B has such a characteristic that a value of the induced voltage $V_B$ output from the detecting coil 13B is gradually increased until the value of the steering torque reaches a negative value of −T1, takes a peak value when the steering torque has the negative value of −T1, and is decreased in an substantially linear characteristic when the steering torque is further increased from −T1 and is changed from a negative region to a positive region.

As shown in FIG. 5, the magnetostrictive characteristic curve 51A related to the detecting coil 13A and the magnetostrictive characteristic curve 51B related to the detecting coil 13B have an substantially line symmetrical relationship in relation to an axis of ordinates including a point on which both of the magnetostrictive characteristic curves intersect each other through a reflection of the fact that they have magnetic anisotropies in reverse directions to each other in the respective magnetostrictive films 14A and 14B.

A line 52 shown in FIG. 5 indicates a graph created based on a value obtained by subtracting each corresponding value of the magnetostrictive characteristic curve 51B which is obtained as the output voltage of the detecting coil 13B from each value of the magnetostrictive characteristic curve 51A which is obtained as the output voltage of the detecting coil 13A in a common region of the magnetostrictive characteristic curves 51A and 51B, that is, a region having an substantially linear characteristic. When the steering torque is zero, the induced voltages output from the detecting coils 13A and 13B are equal to each other. Therefore, a difference therebetween has a value of zero. In the steering torque detecting portion 20, there is used a region which is regarded to have an substantially constant gradient in the vicinity of a neutral point (zero point) of the steering torque in the magnetostrictive characteristic curves 51A and 51B. Consequently, the line 52 is formed to have an substantially linear characteristic. Referring to the characteristic graph of the line 52, an axis of ordinates in FIG. 5 implies an axis indicative of a value of a difference voltage. The line 52 to be the characteristic graph is a straight line passing through an origin (0, 0) and is present on the positive and negative sides of the axes of ordinates and abscissas. The detected output value of the steering torque detecting portion 20 is obtained as the difference ($V_A - V_B$) between the induced voltages output from the detecting coils 13A and 13B as described above. Based on the fact that the line 52 is utilized, therefore, it is possible to detect the direction and magnitude of the steering torque applied to the steering shaft 21.

As described above, it is possible to fetch a detection signal corresponding to a rotating direction and a magnitude in relation to the steering torque input to the steering shaft 21 (the rotating shaft 11) based on the output value of the steering torque detecting portion 20. More specifically, it is possible to know the rotating direction and magnitude of the steering torque acting on the steering shaft 21 based on the detection value output from the steering torque detecting portion 20.

In other words, the detection value of the steering torque detecting portion 20 is output as any point on the line 52 depending on the steering torque. When the detection value is positioned on the positive side in the axis of abscissas, it is decided that the steering torque has a rightward rotation. When the detection value is positioned on the negative side in the axis of abscissas, it is decided that the steering torque has a leftward rotation. Moreover, an absolute value on the axis of ordinates of the detection value has the magnitude of the steering torque. Thus, the characteristic of the line 52 is utilized by the steering torque detecting portion 20. Consequently, it is possible to detect the steering torque on the basis of the output voltage values of the detecting coils 13A and 13B. By using the magnetostrictive torque sensor, moreover, it is possible to fabricate a stable electric power steering apparatus.

With reference to FIGS. 6 to 11, next, description will be given to a method of manufacturing the magnetostrictive torque sensor 10. A main part of the method of manufacturing the magnetostrictive torque sensor 10 shown in FIG. 6 indicates a process for manufacturing the rotating shaft 11 of the magnetostrictive torque sensor 10.

Figure 6:
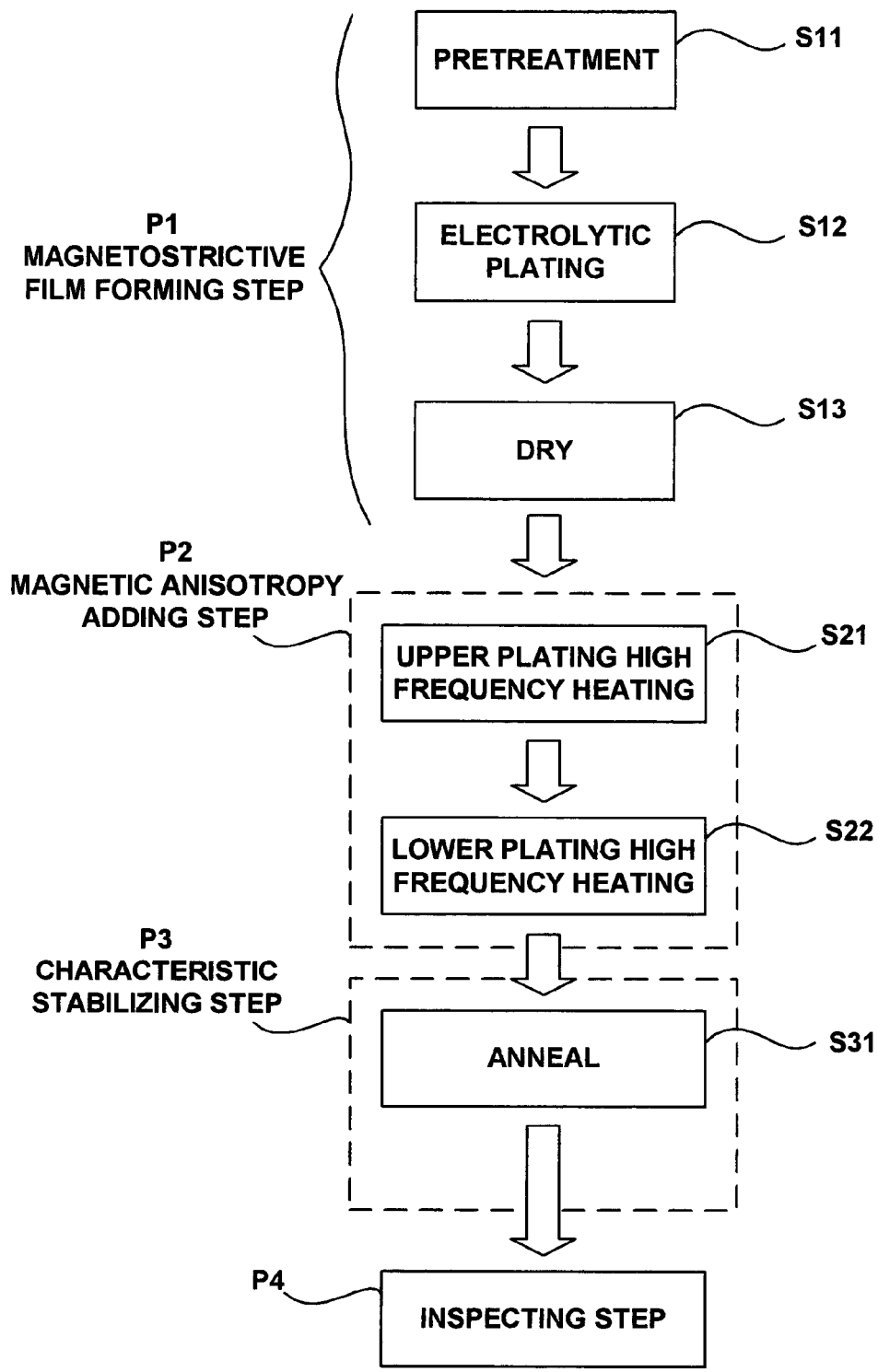
FIG. 6 is a diagram showing a method of manufacturing the magnetostrictive torque sensor according to the exemplary embodiment of the invention, illustrating steps of a process for manufacturing a rotating shaft.

In FIG. 6, the process for manufacturing the rotating shaft 11 is roughly constituted by a magnetostrictive film forming step P1, a magnetic anisotropy adding step P2, a characteristic stabilizing step P3 and an inspecting step P4. The characteristic stabilizing step P3 includes an anneal step P31. At the inspecting step P4, moreover, quality of a rotating shaft which is manufactured is inspected. In order to finish the magnetostrictive torque sensor 10, a detector adding step of adding detectors such as the exciting coil 12 and the detecting coils 13A and 13B on the rotating shaft 11 is provided after the inspecting step P4.

First of all, the magnetostrictive film forming step P1 is executed. At the magnetostrictive film forming step P1, a magnetostrictive material plated portion is formed as a portion to be a base of the magnetostrictive film on the peripheral surfaces of the small diameter portions 11e and 11f of the rotating shaft 11 by an electrolytic plating treatment.

At the magnetostrictive film forming step P1, first of all, a pretreatment is carried out, for example, the rotating shaft 11 formed to have the shapes of the large diameter portions 11b to 11d and the small diameter portions 11e and 11f is washed (a step S11). Then, the electrolytic plating is carried out (a step S12). At the electrolytic plating step, a magnetostrictive material is applied to have a predetermined film thickness in the small diameter portions 11e and 11f in the upper and lower parts of the rotating shaft 11. The upper and lower magnetostrictive material plated portions serve as the magnetostrictive films 14A and 14B having the magnetic anisotropy by a post-treatment which will be described below. Thereafter, drying is executed (a step S13).

At the magnetostrictive film forming step P1, the electrolytic plating method is used for forming the magnetostrictive films 14A and 14B on the surfaces of the predetermined portions of the rotating shaft 11. However, the base portions for forming the magnetostrictive films 14A and 14B in the rotating shaft 11 can also be formed by a method other than the electrolytic plating method, for example, a sputtering method, a PVD method such as an ion plating method or a plasma spraying method.

Next, the magnetic anisotropy adding step P2 is executed. At the magnetic anisotropy adding step P2, the magnetic anisotropy is added to the magnetostrictive material plated portions of the small diameter portions 11e and 11f in the two upper and lower parts formed on the rotating shaft 11, thereby forming the magnetostrictive films 14A and 14B. The magnetic anisotropy adding step P2 has a step S21 of carrying out high frequency heating over the magnetostrictive material plated portion on the upper side and a step S22 of carrying out the high frequency heating over the magnetostrictive material plated portion on the lower side.

Figure 7:
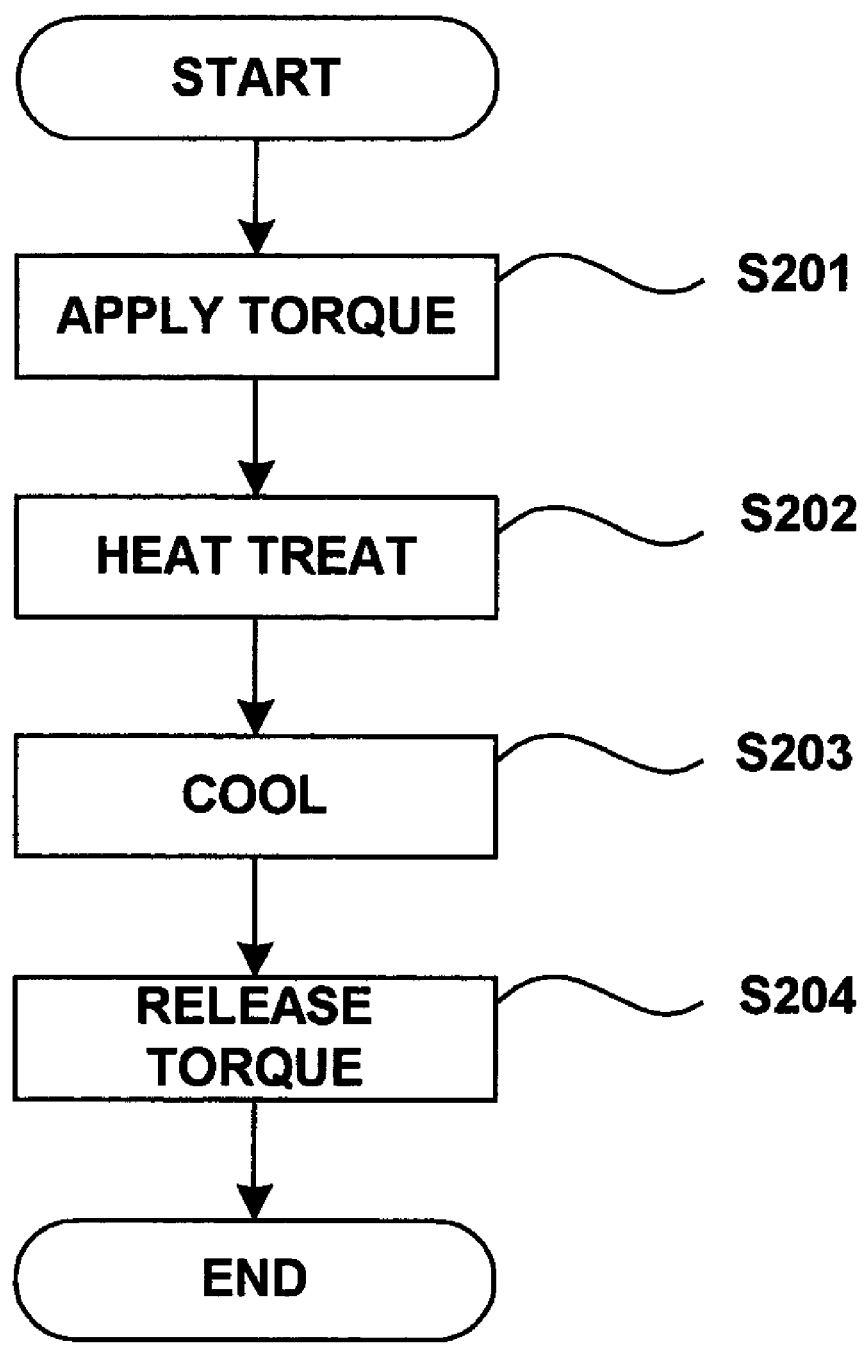
FIG. 7 is a flowchart showing a magnetic anisotropy adding step.

FIG. 7 is a flowchart showing processing steps to be executed at the steps S21 and S22 of the magnetic anisotropy adding step P2.

The step S21 for carrying out the high frequency heating over the upper magnetostrictive material plated portion at the magnetic anisotropy adding step P2 is constituted by a step S201 for applying a predetermined twist torque to the rotating shaft 11 by a torque applying apparatus which is to be first executed, a heat treating step S202 of then supplying a high frequency for only a predetermined time to the upper magnetostrictive material plated portion of the rotating shaft 11 in a state in which the predetermined twist torque is applied and carrying out a heat treatment by an electromagnetic induction, a step S203 of subsequently cooling the heated rotating shaft 11 naturally, and a torque releasing step S204 of finally releasing the twist torque to add a magnetic anisotropy to the upper magnetostrictive material plated portion, thereby forming the magnetostrictive film 14A.

At the heat treating step S202, an induction heating coil formed by a one-winding coil portion is disposed in the upper magnetostrictive material plated portion of the rotating shaft 11 and a predetermined high frequency is supplied from a high frequency power supply to the induction heating coil, thereby carrying out the high frequency heating over only the upper magnetostrictive material plated portion.

Figure 8:
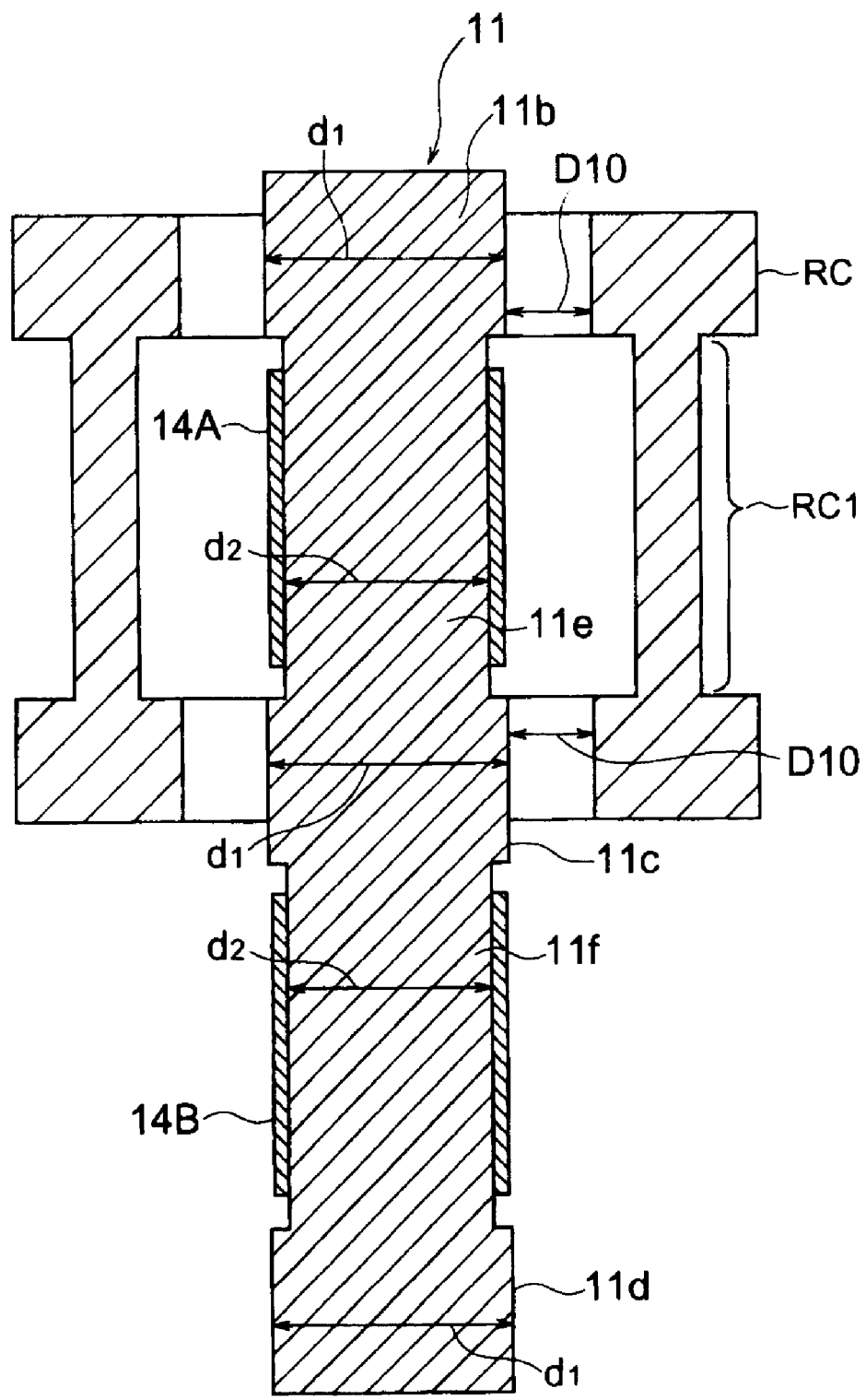
FIG. 8 is a longitudinal sectional view showing a positional relationship based on respective shapes of the rotating shaft and an induction heating coil at the magnetic anisotropy adding step.

FIG. 8 is a sectional view showing a positional relationship between the rotating shaft 11 and the induction heating coil in this case. In FIG. 8, RC denotes an induction heating coil having a one-winding coil portion. The rotating shaft 11 has the small diameter portions 11e and 11f in two places, and the large diameter portions 11b, 11c and 11d positioned on both sides in the axial direction of the respective small diameter portions 11e and 11f. The magnetostrictive material plated portions, that is, the magnetostrictive films 14A and 14B are formed on the respective surfaces of the small diameter portions 11e and 11f in the two places. Description will be given on the assumption that the magnetostrictive material plated portion is set to be the magnetostrictive films 14A and 14B.

When the magnetostrictive film 14A is to be heated by the induction heating coil RC, a distance between the upper large diameter portion 11b of the magnetostrictive film 14A and a corresponding portion of the induction heating coil RC and a distance between the lower large diameter portion 11c and a corresponding portion of the induction heating coil RC are set to be equal to each other, that is, are represented as D10. When the magnetostrictive film 14A is to be heat treated by the high frequency heating of the induction heating coil RC, therefore, a heating state in a portion of the large diameter portion 11b in the vicinity of the upper end of the magnetostrictive film 14A is equal to that of a portion of the large diameter portion 11c in the vicinity of the lower end. Consequently, a temperature distribution in an axial direction over the magnetostrictive film 14A is uniform so that the magnetostrictive film 14A having a uniform magnetic anisotropy can be fabricated. Thus, it is possible to obtain a magnetostrictive torque sensor having a very small variation in a detecting sensitivity.

Moreover, lengths (widths) in the axial direction of the small diameter portions 11e and 11f on which the magnetostrictive films 14A and 14B are to be formed are substantially equal to a width of a portion RC1 in which a concave portion is to be formed on an inner peripheral surface of the induction heating coil RC. For this reason, when the high frequency heating is to be carried out by using the induction heating coil RC to heat treat one magnetostrictive film, the magnetostrictive film can be heated in an substantially uniform temperature distribution so that a magnetostrictive film having a uniform magnetic anisotropy can be fabricated. Thus, it is possible to obtain a magnetostrictive torque sensor having a small variation in a detecting sensitivity.

By the steps S201 to S204, the magnetic anisotropy is added to the upper magnetostrictive material plated portion of the rotating shaft 11. Consequently, the magnetostrictive film 14A having the magnetic anisotropy is formed.

Also in the high frequency heating step S22 for the lower magnetostrictive material plated portion of the rotating shaft 11, similarly, the steps S201 to S204 are executed and the same magnetic anisotropy as described above is added to the lower magnetostrictive material plated portion. Consequently, the magnetostrictive film 14B having the magnetic anisotropy is formed. In this case, when the magnetic anisotropy is added to the lower magnetostrictive material plated portion, a direction of an application of a torque to the rotating shaft 11 is set to be reverse to the magnetic anisotropy of the magnetostrictive film 14B.

Figure 9:
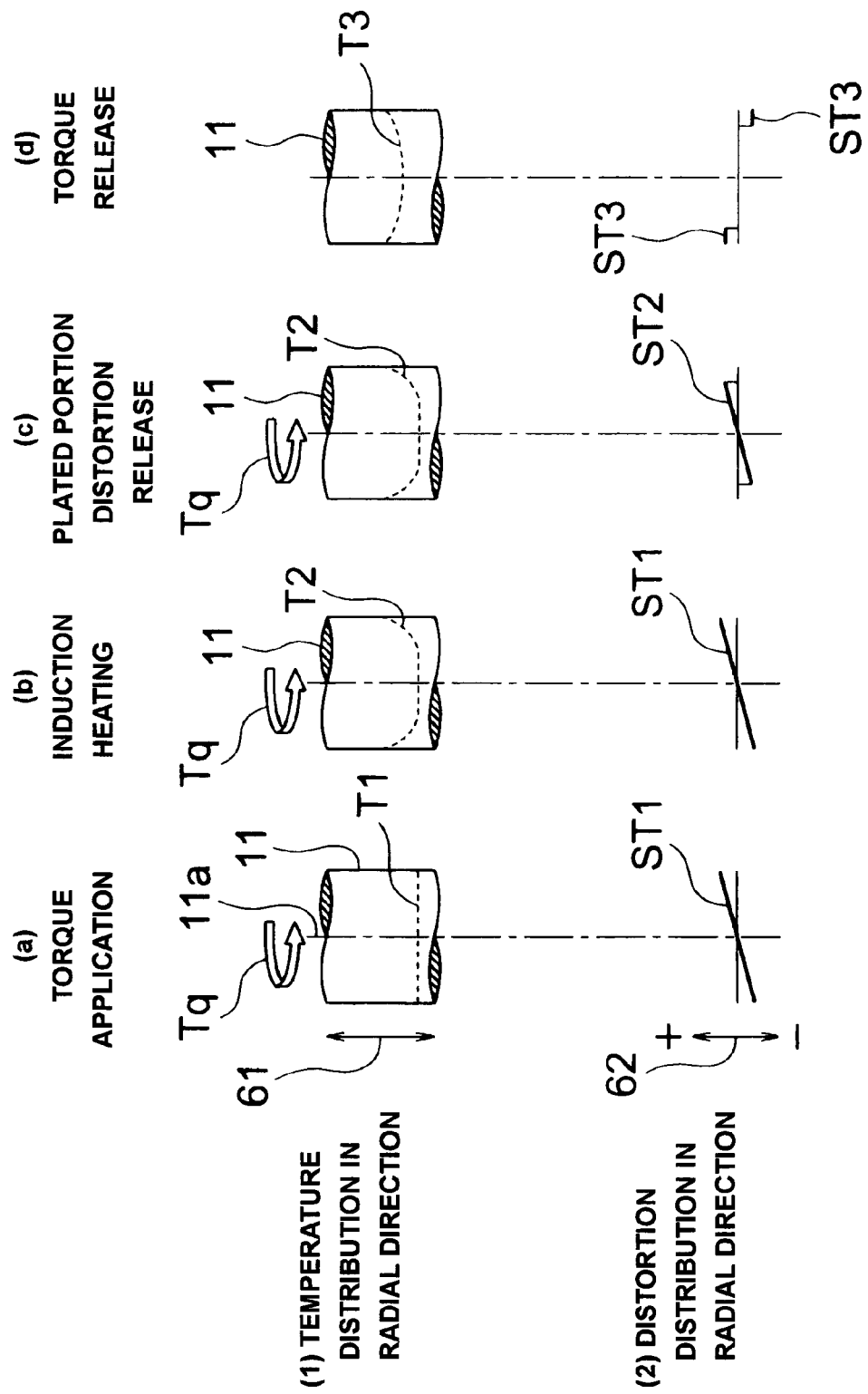
FIG. 9 is a view showing a temperature distribution (1) and a distortion distribution (2) in a radial direction in the rotating shaft at respective steps (a) to (d) of the magnetic anisotropy adding step.
Figure 10:
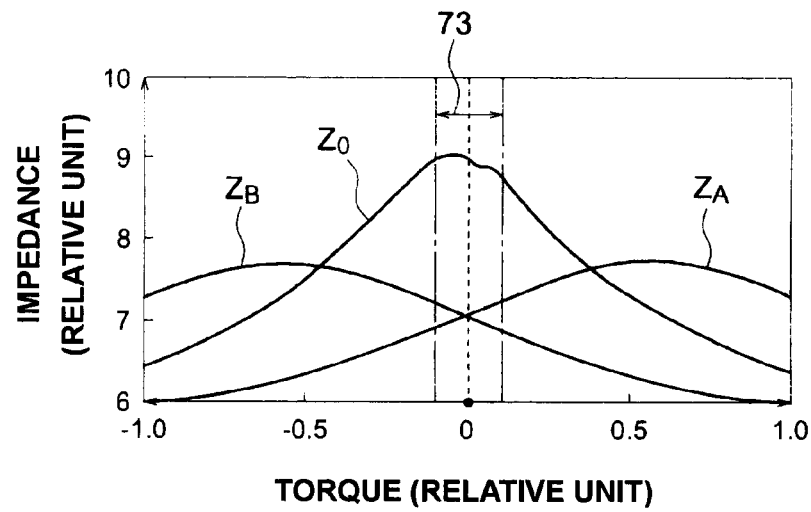
FIG. 10 is a chart showing an impedance characteristic of the magnetostrictive torque sensor immediately after a magnetostrictive material plated portion is formed and an impedance characteristic of the magnetostrictive torque sensor using a magnetostrictive film after adding a magnetic anisotropy in the magnetostrictive torque sensor according to the exemplary embodiment.

With reference to FIGS. 9 and 10, furthermore, a mechanism for adding the magnetic anisotropy to the magnetostrictive material plated portion to form the magnetostrictive film 14A at the magnetic anisotropy adding step P2 will be descried in detail in respect of a principle.

In FIG. 9, referring to a temperature distribution (1) and a distortion distribution (2) in a radial direction of the rotating shaft 11 shown in a vertical direction, there are illustrated four states including (a) a torque applying state, (b) an induction heating state, (c) a plated portion distortion releasing state and (d) a torque releasing state in a transverse direction. The torque applying state (a), the induction heating state (b), the plated portion distortion releasing state (c) and the torque releasing state (d) correspond to the steps S201, S202, S203 and S204 in FIG. 7, respectively. In (1) and (2) of FIG. 9, axes 61 and 62 indicate a temperature and a distortion, respectively.

In (a) of FIG. 9, a torsion torque Tq is caused to act on the rotating shaft 11 to apply a stress to the circumferential surface of the rotating shaft 11. Consequently, the torsion torque Tq acts. In this case, the distortion distribution in the radial direction of the rotating shaft 11 is set to be a distribution ST1 which is increased from the axial center 11a positioned on the center of the rotating shaft 11 in a peripheral edge direction. Also in consideration of a direction of the distribution of the distortion, the distribution ST1 is reversed at right and left sides of the axial center 11a.

Therefore, the distortion distribution on the right side is shown in a positive side (+) and the distortion distribution on the left side is shown in a negative side (−). In (a) of FIG. 9, furthermore, the temperature distribution in the radial direction of the rotating shaft 11 is shown in a broken line and is thus set to be a constant distribution T1 at a room temperature from the axial center 11a of the rotating shaft 11 in the peripheral edge direction. The room temperature is a reference temperature of the rotating shaft 11.

In (b) of FIG. 9, the magnetostrictive material plated portion is surrounded by the induction heating coil with the torsion torque Tq acting on the rotating shaft 11, and a high frequency current is caused to flow to the induction heating coil to heat treat the magnetostrictive material plated portion. In (b) of FIG. 9, the distortion distribution in the radial direction of the rotating shaft 11 is the same as that in (a) of FIG. 9. Moreover, the temperature distribution in the radial direction of the rotating shaft 11 is set to be a distribution T2 which is rapidly increased from a closer portion to an outer peripheral edge portion of the rotating shaft 11 toward the outer peripheral edge.

In (c) of FIG. 9, cooling is carried out. As a result, a creep is generated in the magnetostrictive material plated portion so that the distortion in the magnetostrictive material plated portion is zero. At this time, the distortion distribution in the radial direction of the rotating shaft 11 is indicated as ST2. A step shown in the state of (c) of FIG. 9 is the step S203 of naturally carrying out the cooling after the heat treatment. A shape of the temperature distribution T2 in the radial direction of the rotating shaft 11 is not substantially changed but the temperature is lowered as a whole with a transition of the cooling process.

In (d) of FIG. 9, the torsion torque Tq applied to the rotating shaft 11 is released after the cooling. Thus, the torque release is carried out. As shown in a distortion distribution ST3, consequently, the distortion distribution in the radial direction in the rotating shaft 11 is zero. On the other hand, as shown in the distortion distribution ST3, a distortion distribution is generated in only the magnetostrictive material plated portion. As a result, a magnetic anisotropy can be added to the magnetostrictive material plated portion through the distortion distribution ST3. Consequently, it is possible to form the magnetostrictive film 14A having the magnetic anisotropy. In FIG. 9(d), the temperature distribution is reduced to be smoothly distributed as a whole as shown in T3.

When the magnetostrictive film 14B is to be formed, a reverse magnetic anisotropy to that in the magnetostrictive film 14A is added. Therefore, a clockwise torsion torque in a reverse direction to the torsion torque Tq is applied to execute the process.

FIG. 10 shows an impedance characteristic $Z_0$ of the magnetostrictive material plated portion provided in the two upper and lower portions of the rotating shaft 11 and impedance characteristics $Z_A$ and $Z_B$ of the magnetostrictive films 14A and 14B formed by adding the magnetic anisotropy to the magnetostrictive material plated portion. In FIG. 10, an axis of abscissas indicates a torque (Nm) and an axis of ordinates indicates an impedance (Ω). The impedance characteristic $Z_0$ in the magnetostrictive material plated portion in a previous stage to the addition of the magnetic anisotropy is changed into the impedance characteristic $Z_A$ in case of the magnetostrictive film 14A or is changed into the impedance characteristic $Z_B$ in case of the magnetostrictive film 14B by the addition of the magnetic anisotropy. The magnetostrictive film 14A has the impedance characteristic $Z_A$. Therefore, the detecting coil 13A corresponding to the magnetostrictive film 14A has the magnetostrictive characteristic curve 51A. Moreover, the magnetostrictive film 14B has the impedance $Z_B$. Therefore, the detecting coil 13B corresponding to the magnetostrictive film 14B has the magnetostrictive characteristic curve 51B.

In FIG. 10, in a range 73, an substantially linear change characteristic is obtained as an overlapping portion of the impedance characteristics $Z_A$ and $Z_B$. The range 73 is utilized as a sensor using range of the magnetostrictive torque sensor 10.

Figure 11:
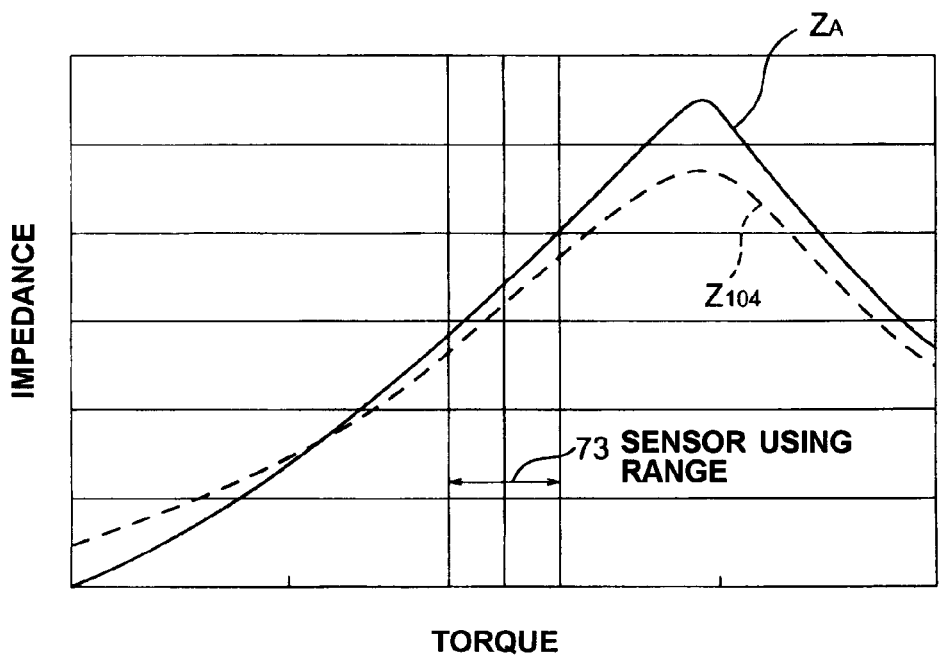
FIG. 11 is a graph showing a comparison between the impedance characteristic of the magnetostrictive torque sensor according to the exemplary embodiment and a conventional one.
Figure 12:
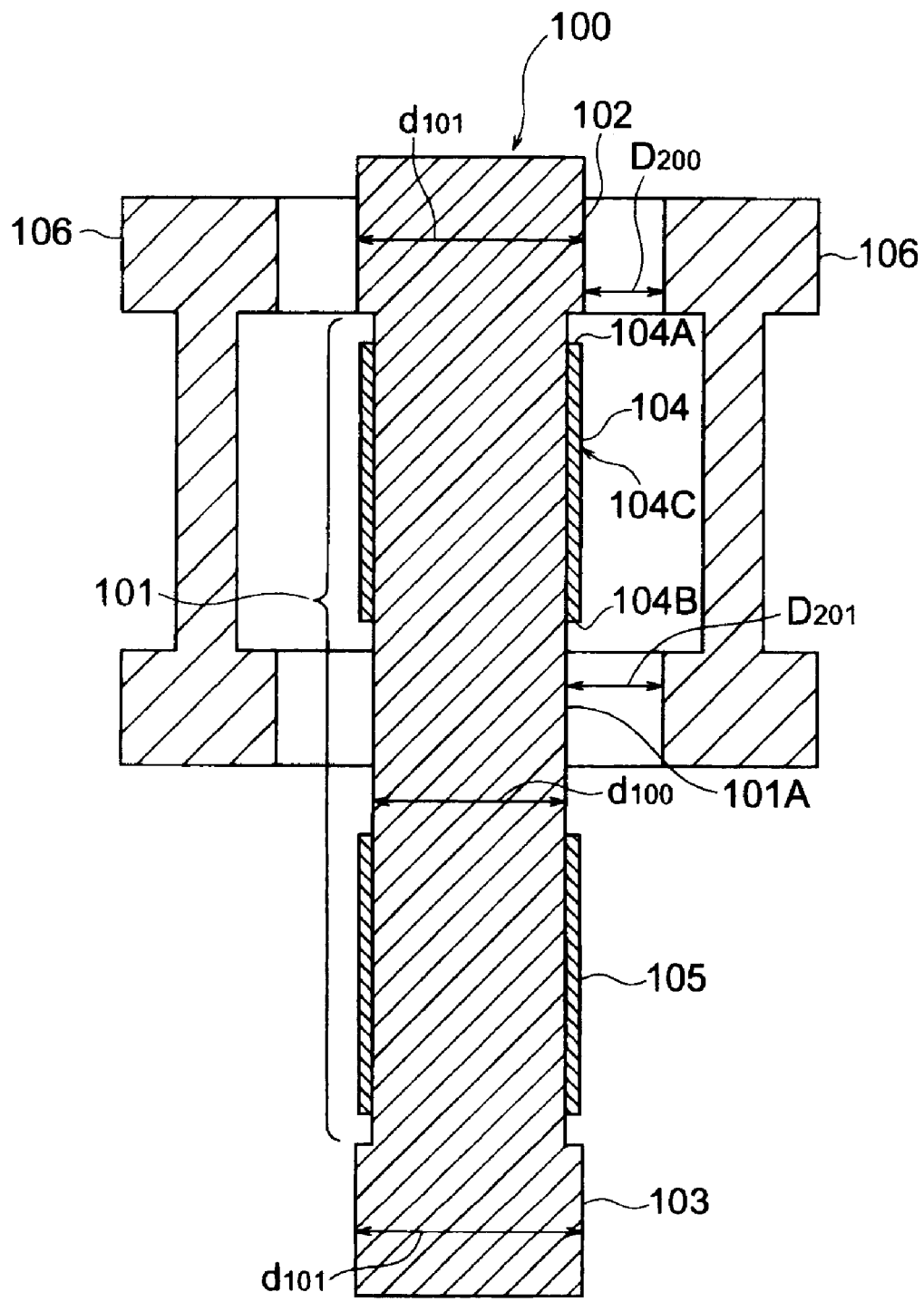
FIG. 12 is a longitudinal sectional view for explaining a problem in respect of a relationship between the rotating shaft and the induction heating coil at the magnetic anisotropy adding step, in a related art.
Figure 13:
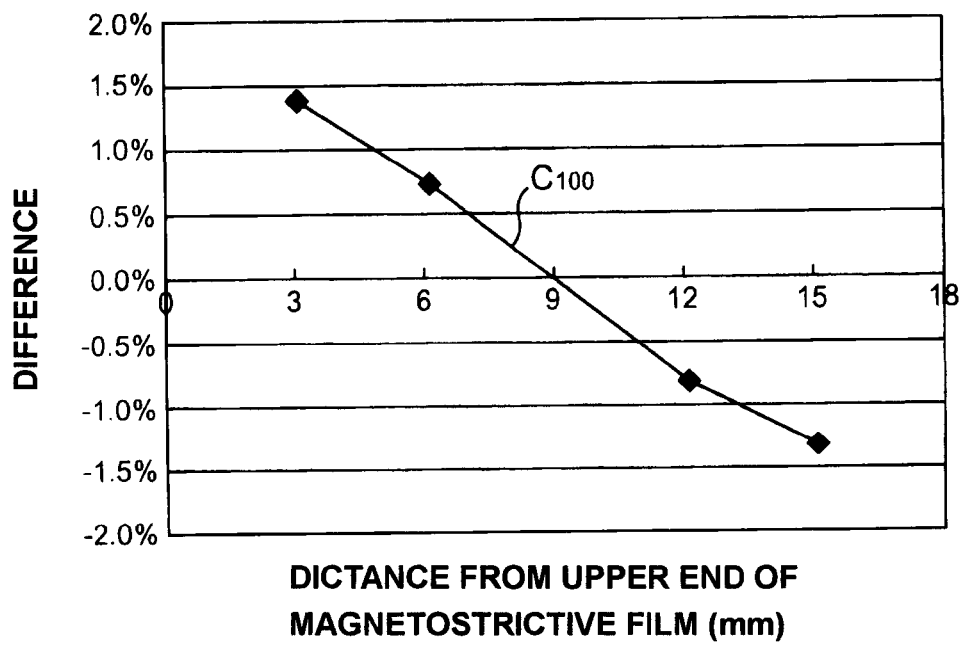
FIG. 13 is a graph showing a temperature distribution in heating of the magnetostrictive film in order to explain the problem.
Figure 14:
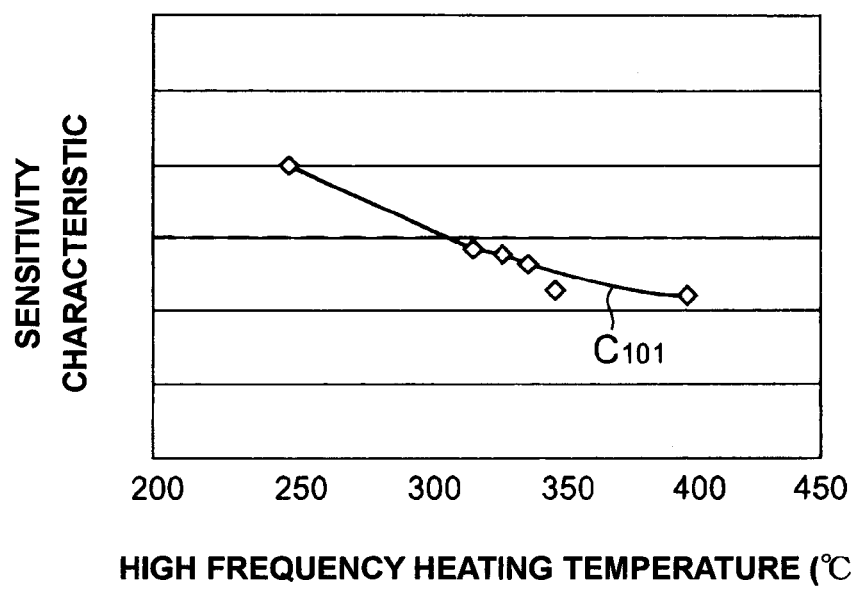
FIG. 14 is a graph showing a sensitivity characteristic of the magnetostrictive torque sensor for a heating temperature of the magnetostrictive film in order to explain the problem.

FIG. 11 shows an impedance characteristic $Z_{104}$ of the magnetostrictive film 104 formed by adding the magnetic anisotropy to the magnetostrictive material plated portion in the rotating shaft 100 and the impedance characteristic $Z_A$ of the magnetostrictive film 14A formed by the rotating axis 11 according to the embodiment. From FIG. 11, it is apparent that the magnetostrictive characteristic of the magnetostrictive film 14A through the rotating axis 11 according to the embodiment is enhanced.

Returning to FIG. 6, description will be given. The characteristic stabilizing step P3 is carried out after the magnetic anisotropy adding step P2. At the characteristic stabilizing step P3, the anneal step P31 is carried out. At the anneal step P31, for example, a heat treatment is carried out for a predetermined time at a temperature which is equal to or higher than a use temperature in a situation in which the steering torque detecting portion 20 is used.

After the anneal step P31, the inspecting step P4 to be executed in the form of a sampling inspection is carried out.

Then, a detector disposing step (not shown) of disposing a detector such as an exciting coil is provided and detecting means for detecting a change in a magnetostrictive characteristic is disposed around the magnetostrictive films 14A and 14B of the rotating shaft 11. By the steps, the magnetostrictive torque sensor 10 is finished.

As described above, according to the exemplary embodiment of the invention, the temperature distribution in the magnetostrictive film can be uniform and the magnetostrictive film having a uniform magnetic anisotropy can be fabricated at the step of heating the magnetostrictive film. Thus, it is possible to obtain the magnetostrictive torque sensor having a small variation in a detecting sensitivity.

The structure, the shape, the size and the disposition relationship described in the embodiment have been schematically shown in such a manner that the invention can be understood and carried out, and furthermore, the numerical values and the composition of each structure (the material) are only illustrative. Accordingly, the invention is not restricted to the embodiment described above but it is possible to make changes into various configurations without departing from the scope of the technical thought described in the claims.

The invention is utilized as a magnetostrictive torque sensor for detecting a steering torque by an electric power steering apparatus.

What is claimed is:

1. A method of manufacturing a rotating shaft, the rotating shaft comprising:
   a first portion having a first diameter;
   a second portion being adjacent to the first portion in an axial direction and having a second diameter, wherein the second diameter is smaller than the first diameter;
   a third portion being adjacent to the second portion in the axial direction in an opposite side of the first portion and having the first diameter; and
   a magnetostrictive film provided on the second portion, and the method comprising:
   applying a magnetostrictive material on the second portion,
   applying a predetermined twist torque by a torque applying apparatus to the rotating shaft in which the magnetostrictive material is applied on the second portion,
   disposing an induction heating coil on a position facing to the second portion, the induction heating coil including a concave portion having a length substantially equal to a length in an axial direction of the second portion,
   heating the second portion, in a state in which the predetermined twist torque is applied on the rotating shaft, by the induction heating coil, and
   releasing the twist torque.

2. The method according to claim 1, wherein a distance between the first portion and a corresponding portion of the induction heating coil is substantially the same with a distance between the third portion and a corresponding portion of the induction heating coil.

3. A rotating shaft, comprising:
   a first portion having a first diameter;
   a second portion being adjacent to the first portion in an axial direction and having a second diameter, wherein the second diameter is smaller than the first diameter;
   a third portion being adjacent to the second portion in the axial direction in an opposite side of the first portion and having the first diameter;
   a fourth portion being adjacent to the third portion in the axial direction in an opposite side of the second portion and having the second diameter;
   a fifth portion being adjacent to the fourth portion in the axial direction in an opposite side of the third portion and having the first diameter;
   a first magnetostrictive film provided on the second portion; and
   a second magnetostrictive film provided on the fourth portion.

* * * * *

UNITED STATES PATENT AND TRADEMARK OFFICE
CERTIFICATE OF CORRECTION

PATENT NO. : 7,677,115 B2 Page 1 of 1
APPLICATION NO. : 11/687276
DATED : March 16, 2010
INVENTOR(S) : Fukuda et al.

It is certified that error appears in the above-identified patent and that said Letters Patent is hereby corrected as shown below:

Title Page, Item (75), "Inventors", delete "Toshigi" and insert -- Tochigi --

Signed and Sealed this

Eleventh Day of May, 2010

David J. Kappos
*Director of the United States Patent and Trademark Office*